US008111699B2

(12) United States Patent
Hu

(10) Patent No.: US 8,111,699 B2
(45) Date of Patent: Feb. 7, 2012

(54) BASE STATION ACCESS SYSTEM AND BASE STATION DATA TRANSMISSION METHOD

(75) Inventor: Qiang Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 985 days.

(21) Appl. No.: 12/039,460

(22) Filed: Feb. 28, 2008

(65) Prior Publication Data

US 2008/0170542 A1    Jul. 17, 2008

Related U.S. Application Data

(63) Continuation of application No. PCT/CN2006/001605, filed on Jul. 7, 2006.

(30) Foreign Application Priority Data

Aug. 30, 2005    (CN) .......................... 2005 1 0093601

(51) Int. Cl.
*H04L 12/28* (2006.01)
*H04L 12/56* (2006.01)
*H04J 3/04* (2006.01)

(52) U.S. Cl. .................. 370/394; 370/395.1; 370/473; 370/535

(58) Field of Classification Search .................. 370/310, 370/328, 329, 338, 350, 351, 352, 389, 392, 370/394, 395.1, 395.52, 464–467, 469, 473, 370/474, 493–495, 535–537, 542; 709/227–229, 709/231, 232, 238, 245; 375/219, 220, 222, 375/295, 316; 455/9, 422.1, 423, 424, 435.2, 455/436, 446, 450, 453

See application file for complete search history.

(56) References Cited

U.S. PATENT DOCUMENTS

| 6,498,806 B1 | 12/2002 | Davis |
| 6,618,374 B1 | 9/2003 | Buckland et al. |
| 6,912,197 B2 * | 6/2005 | Mahamuni ..................... 370/219 |

(Continued)

FOREIGN PATENT DOCUMENTS

CN    1250303 A    4/2000

(Continued)

OTHER PUBLICATIONS

Christopher Metz, "A Pointed Look at the Point-to-Point Protocol", IEEE, 1999.*

(Continued)

*Primary Examiner* — Aung S Moe
*Assistant Examiner* — Habte Mered
(74) *Attorney, Agent, or Firm* — Conley Rose, P.C.; Grant Rodolph

(57) ABSTRACT

A base station access system and a base station data transmission method. The system includes a base station and a broadband access point. An embodiment of base station data transmission method includes: a base station assigns sequence number identifications to uplink data packets, the base station sends the uplink data packets with the sequence number identifications out via multiple xDSL links; by the broadband access point arranges the uplink data packets according to the sequence number identifications of the received uplink data packets, broadband access point extracts the arranged uplink data packets, the broadband access point sends the extracted uplink data packets out. The embodiment of the present invention improves the transmission band of the base station accessing while ensuring the transmission distance of the base station accessing.

17 Claims, 5 Drawing Sheets

U.S. PATENT DOCUMENTS

| | | | |
|---|---|---|---|
| 6,963,561 B1 * | 11/2005 | Lahat | 370/356 |
| 7,542,482 B2 * | 6/2009 | Casaccia et al. | 370/473 |
| 7,586,918 B2 * | 9/2009 | Levy et al. | 370/395.1 |
| 2002/0146010 A1 | 10/2002 | Shenoi et al. | |
| 2003/0048802 A1 | 3/2003 | Shenoi | |
| 2003/0108063 A1 * | 6/2003 | Joseph et al. | 370/465 |
| 2003/0128681 A1 * | 7/2003 | Rauschmayer | 370/338 |
| 2003/0156556 A1 | 8/2003 | Puig-Oses et al. | |
| 2004/0022276 A1 | 2/2004 | Gazier et al. | |
| 2004/0100899 A1 * | 5/2004 | Mahamuni | 370/216 |
| 2005/0152385 A1 | 7/2005 | Cioffi | |
| 2005/0201379 A1 | 9/2005 | Zhang et al. | |
| 2006/0062206 A1 * | 3/2006 | Krishnaswamy | 370/352 |
| 2006/0182152 A1 * | 8/2006 | Bi et al. | 370/542 |

FOREIGN PATENT DOCUMENTS

| | | |
|---|---|---|
| CN | 1578237 A | 2/2005 |
| CN | 1589041 A | 3/2005 |
| CN | 1787467 A | 6/2006 |
| EP | 0 981 242 A2 | 2/2000 |
| EP | 1 094 646 A2 | 4/2001 |
| WO | WO 03/098850 A1 | 11/2003 |
| WO | WO 2005/071904 A2 | 8/2005 |

OTHER PUBLICATIONS

Duncan Bees, "Flexible Bandwidth Service with DSL Bonding",PMC Sierra, Aug. 2002, www.pmc-sierra.com/cgi-bin/document.pl?docnum=2021395.*

Sklower,K., et. al., "The PPP Multilink Protocol (MP)," RFC 1990, Aug. 1996.

Foreign Communication From a Related Counterpart Application, European Application 06753121.0, Office Action dated May 26, 2009, 10 pages.

Foreign Communication From a Related Counterpart Application, PCT Application PCT/CN2006/001605, English Translation of Written Opinion dated Oct. 19, 2006, 3 pages.

Foreign Communication From a Related Counterpart Application, Chinese Application 200510085711.4, English Translation of Fifth Chinese Office Action dated Mar. 30, 2011, 8 pages.

Foreign Communication From a Related Counterpart Application, PCT Application PCT/CN2006/001605, International Search Report dated Oct. 19, 2006, 2 pages.

* cited by examiner

BASE STATION ACCESS SYSTEM AND BASE STATION DATA TRANSMISSION METHOD

CROSS-REFERENCE TO RELATED APPLICATIONS

This application is a continuation of International Patent Application No. PCT/CN2006/001605, filed Jul. 7, 2006, which claims priority to Chinese Patent Application No. 200510093601.2, filed Aug. 30, 2005, both of which are hereby incorporated by reference.

FIELD OF THE INVENTION

The present invention relates to radio communication technologies, and more particularly to a base station access and base station data transmission technology.

BACKGROUND OF THE INVENTION

With the development of radio networks, data services play a more and more important role in the radio networks, and accordingly require a broader and broader transmission bandwidth. The data services demand a broader bandwidth than voice services do. Especially after the introduction of High Speed Downlink Packet Access (HSDPA), High Speed Uplink Packet Access (HSUPA) and Code Division Multiple Access (CDMA) 1X Do, the transmission rates of the data services that may be provided for the terminals have become higher and higher, and development of the data services has also become faster and faster. Consequently, the traffic load on a base station grows increasingly, and a broader transmission bandwidth is demanded by the base station. In the conventional radio networks, the base stations having three sectors are generally used. After the introduction of HSDPA, HSUPA or CDMA 1X Do, the downlink throughput of the base station may be up to 9 megabits per second (Mbps) and the uplink throughput thereof may be up to 1 Mbps, so as to ensure the data service transmission for the terminals. Plus the overheads of the lower layers, the resulting rate of the physical layer is proximately 15 Mbps in the downlink direction and 1.5 Mbps in the uplink direction. The fees for the data services are relatively low, and thus the income from the data services is greatly less than that from the voice services. In this case, if operators go on to implement the access and data transmission of the base station by using the E1/T1. with expensive rent, their profit is reduced severely.

The x Digital Subscriber Line (xDSL) is a family of technologies that provide very high-bandwidth digital signal transmission over conventional telephone lines and have advantages in convenient access, abundant transmission resources and low transmission cost. At present the xDSL technologies are generally applied in the radio networks. Compared with the accessing of base station by use of E1/T1, the accessing of base station by use of xDSL may reduce the cost in base station access significantly.

It is primarily the Very high speed Digital Subscriber Line (VDSL) and the Asymmetric Digital Subscriber Line (ADSL) in the xDSL family that are used to implement the base station access in the prior art. The two application scenarios are described respectively as below.

FIG. 1 shows a schematic diagram of a networking structure for implementing base station access by use of VDSL in the prior art. It may he seen from FIG. 1 that a base station is connected to a VDSL Modem via an Ethernet line, the VDSL Modem is connected to a Digital Subscriber Line Access Multiplexer (DSTAM) via a twisted-pair, and the DSLAM is connected to a Broadband Access Service (BAS) via a fast Ethernet network. The BAS transfers the traffic on the DSLAM to a radio network controller (RNC) via an IP network, The transmission rate of VDSL in the uplink direction may be up to 1.5 Mbps and in the downlink direction may be up to 12 Mbps. Thus, the bandwidth of VDSL may meet the requirements for data transmission in base station access. However, the valid transmission distance of VDSL is 1 kilometer(km) beyond which the rate of VDSL decreases rapidly. Therefore, VDSL may be only used in short-distance base station access and thus can not be applied widely.

FIG. 2 shows a schematic diagram of a networking structure for implementing base station access by use of ADSL in the prior art. This figure is basically the same as FIG. 1, except that the base station is connected to an ADSL Modem via an Ethernet line and ADSL access technologies are employed therein.

ADSL is applied widely. ADSL has a valid transmission distance up to 3 km and thus is applicable to long-distance base station access. However, because the bandwidth of ADSL is too narrow, i.e. proximately 0.5 Mbps in the uplink direction and proximately 6 Mbps in the downlink direction, the base station access by use of ADSL is unable to meet the requirements of most base stations for transmission bandwidth.

SUMMARY OF THE INVENTION

The present invention provides a base station access system and a base station data transmission method, in order to solve the issues in the prior art that the implementation of base station access by use of VDSL is only applicable to the accessing of base stations near the DSLAM while the implementation of base station access by use of ADSL is unable to meet the requirements of most base stations for transmission bandwidth.

A base station access system, includes:

a base station, configured to assign sequence number identifications to uplink data packets in turn, and send the uplink data packets out in parallel via multiple asymmetric digital subscriber line links; or to receive downlink data packets sent in parallel on the multiple asymmetric digital subscriber line links, arrange the downlink data packets in order and send the downlink data packets to terminals; and a broadband access point, configured to receive the uplink data packets sent in parallel, arrange the uplink data packets in order and send the uplink data packets to a base station controller; or to assign sequence number identifications to the downlink data packets and in turn and send the downlink data packets to the multiple asymmetric digital subscriber line links.

The base station access system further includes a digital subscriber line access multiplexer, connected between the multiple asymmetric digital subscriber line links and the base station, and configured to receive and forward the uplink data packets sent from the base station and send the downlink data packets to the base station via the multiple asymmetric digital subscriber line links.

The broadband access point includes: an adaption module, configured to arrange the uplink data packets sent from the digital subscriber line access multiplexer in order according to the sequence number identifications of the uplink data packets, and assign sequence number identifications in turn to the downlink data packets received by the adaption module and send the downlink data packets to the digital subscriber line access multiplexer; and a broadband access server, configured to send the arranged uplink data packets to the base station controller via a broadband network, and receive the downlink data packets sent by the base station controller via the broadband network.

The adaption module is disposed in the broadband access server or is a separate entity of the base station access system.

Multiple Ethernet ports corresponding to the individual asymmetric digital subscriber line links respectively are provided on the base station.

The broadband access point is connected to the digital subscriber line access multiplexer via a fast Ethernet network.

A base station data transmission method which is applied to the base station access system of the present invention includes: A. assigning, by a base station, sequence number identifications to uplink data packets in turn, and sending, by the base station, the uplink data packets with the sequence number identifications to a digital subscriber line access multiplexer via multiple asymmetric digital subscriber line links; B. receiving, by the digital subscriber line access multiplexer, the uplink data packets sent from the base station, and forwarding, by the digital subscriber line access multiplexer, the uplink data packets to a broadband access point; and C. arranging, by the broadband access point, the uplink data packets according to the sequence number identifications of the uplink data packets, and sending, by the broadband access point, the arranged uplink data packets to a base station controller.

The process A includes: assigning, by the base station, the sequence number identifications to the uplink data packets in turn by use of a multi-link point to point protocol; and mapping, by the base station, the uplink data packets with the sequence number identifications into Ethernet frames, and sending, by the base station, the Ethernet frames to the digital subscriber line access multiplexer via the multiple asymmetric digital subscriber line links.

Another base station data transmission method includes: A. assigning, by a broadband access point, sequence number identifications to downlink data packets in turn, and sending, by the broadband access point, the downlink data packets with the sequence number identifications to a digital subscriber line access multiplexer; B. sending, by the digital subscriber line access multiplexer, the downlink data packets with the sequence number identifications to a base station via multiple asymmetric digital subscriber line links; and C. receiving, by the base station, the downlink data packets on the multiple asymmetric digital subscriber line links, arranging, by the base station, the downlink data packets in order, and sending, by the base station, the downlink data packets to terminals.

The process A includes: assigning, by the broadband access point, the sequence number identifications in turn to the downlink data packets from a base station controller according to a multi-link point to point protocol; and mapping, by the broadband access point, the downlink data packets with the sequence number identifications into Ethernet frames, and sending, by the broadband access point, the Ethernet frames to the digital subscriber line access multiplexer.

According to the base station data transmission method, if a downlink data packet to be received by the base station is lost, the base station may request the broadband access point to retransmit the downlink data packet or may discard the downlink data packet.

The present invention has the advantages as follows.

The present invention employs the Multi-link Point to Point Protocol (ML-PPP) to bundle multiple ADSL links, and implements the accessing of the base station by using the bundled ADSL links, thereby effectively increasing the transmission bandwidth in the base station access while ensuring the transmission distance of the base station access. Therefore the present invention may be widely applied to the accessing of base stations far from the DSLAM and/or base stations having a demand for a broader transmission bandwidth.

DETAILED DESCRIPTION OF THE EMBODIMENTS

The present invention employs the Multi-link Point to Point Protocol (ML-PPP) to bundle multiple ADSL links, and implements the accessing of the base station by using the bundled ADSL links, thereby meeting the requirements for data transmission distance and bandwidth in base station access.

The principles, embodiments and beneficial effects of the inventive technical solutions are detailed hereunder in conjunction with the accompanying drawings.

Figure 1:
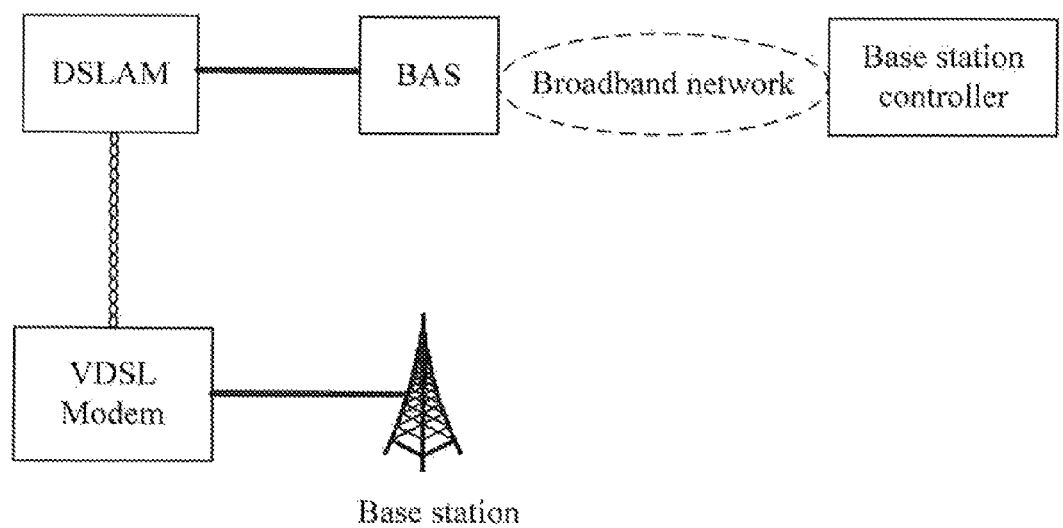
FIG. 1 is a schematic diagram illustrating a networking structure for implementing base station access by use of VDSL in the prior art.
Figure 2:
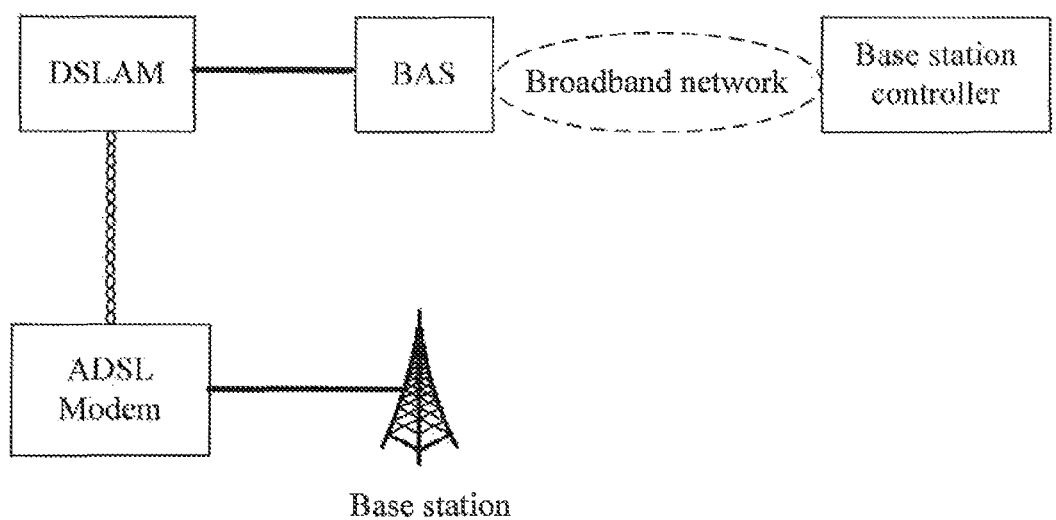
FIG. 2 is a schematic diagram illustrating a networking structure for implementing base station access by use of ADSL in the prior art.
Figure 3:
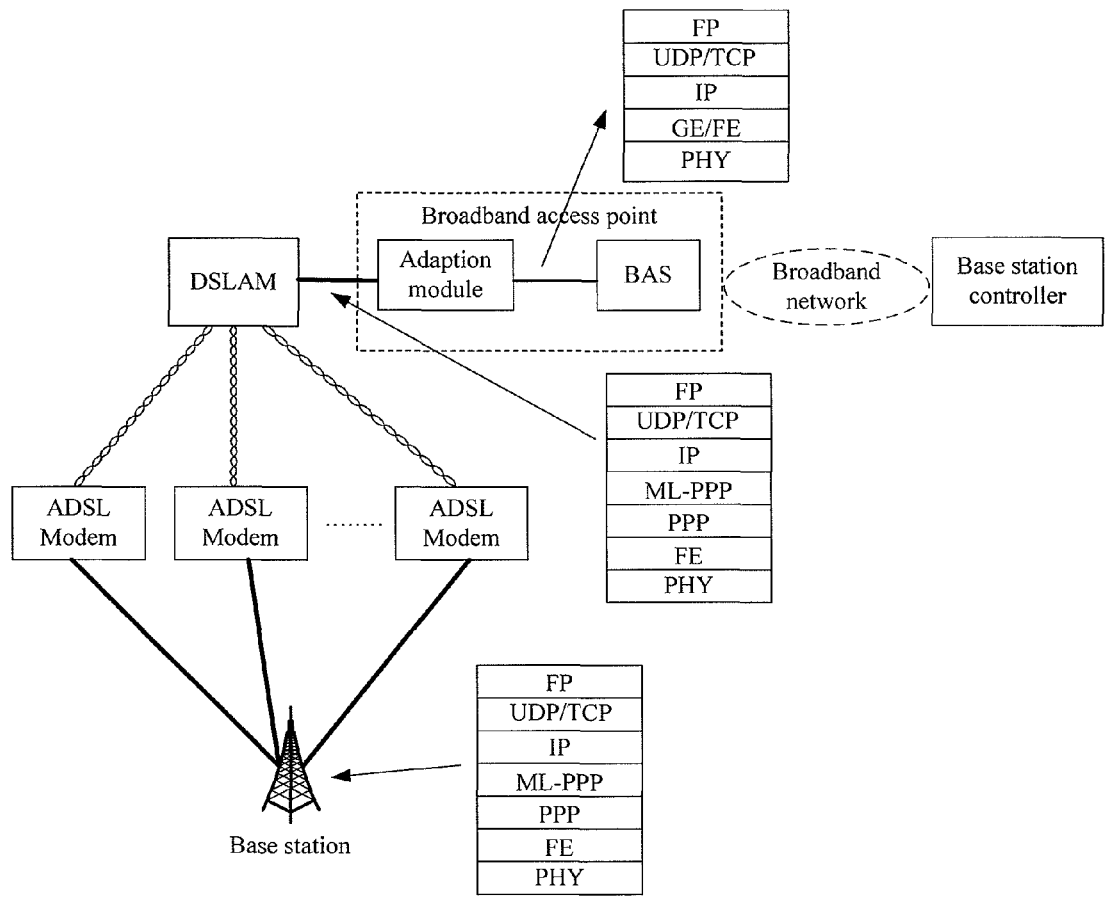
FIG. 3 is a schematic diagram illustrating a networking structure of a base station access system according to a first embodiment of the present invention.

FIG. 3 shows a schematic diagram of a networking structure of a base station access system according to a first embodiment of the present invention. In FIG. 3, the base station access system according to the first embodiment of the present invention includes a base station, a DSLAM and a broadband access point.

In the present embodiment, the base station assigns a sequence number identification to each of uplink data packets in turn, and sends the uplink data packets out via multiple ADSL links. The base station also arranges downlink data packets on the multiple ADSL links in order, and extracts and sends traffic data to corresponding terminals.

The DSLAM is connected to the base station via the multiple ADSL links, and configured to receive and forward the uplink data packets sent from the base station, and send the downlink data packets to the base station via the multiple ADSL links.

The broadband access point is connected to the DSLAM with a fast Ethernet network, and configured to arrange the uplink data packets from the DSLAM in order and send the arranged uplink data packets to a base station controller via a broadband network. The broadband access point is also configured to assign a sequence number identification to each of the received downlink data packets from the base station controller in turn and send the downlink data packets to the DSLAM.

To enable the base station to access the DSLAM via the multiple ADSL links, the base station access system according to the first embodiment of the present invention provides multiple Ethernet interfaces on the base station, each of the Ethernet interfaces corresponding to one of the ADSL links.

Over each of the ADSL links, the base station is connected to the ADSL Modem and the ADSL Modem is connected to the DSLAM.

The broadband access point includes an adaption module and a broadband access server.

In the present embodiment, the adaption module is configured to arrange the uplink data packets sent from the digital subscriber line access multiplexer in order according to the sequence number identifications of the uplink data packets, and to assign an sequence number identification to each of the received downlink data packets in turn according to the ML-PPP protocol and send the downlink data packets to the DSLAM.

The broadband access server is configured to send the arranged uplink data packets to the base station controller via the broadband network, and to receive the downlink data packets sent from the base station controller via the broadband network.

The adaption module may be disposed in the broadband access server as a component thereof, and may also be a separate entity of the base access system according to the first embodiment.

Figure 4:
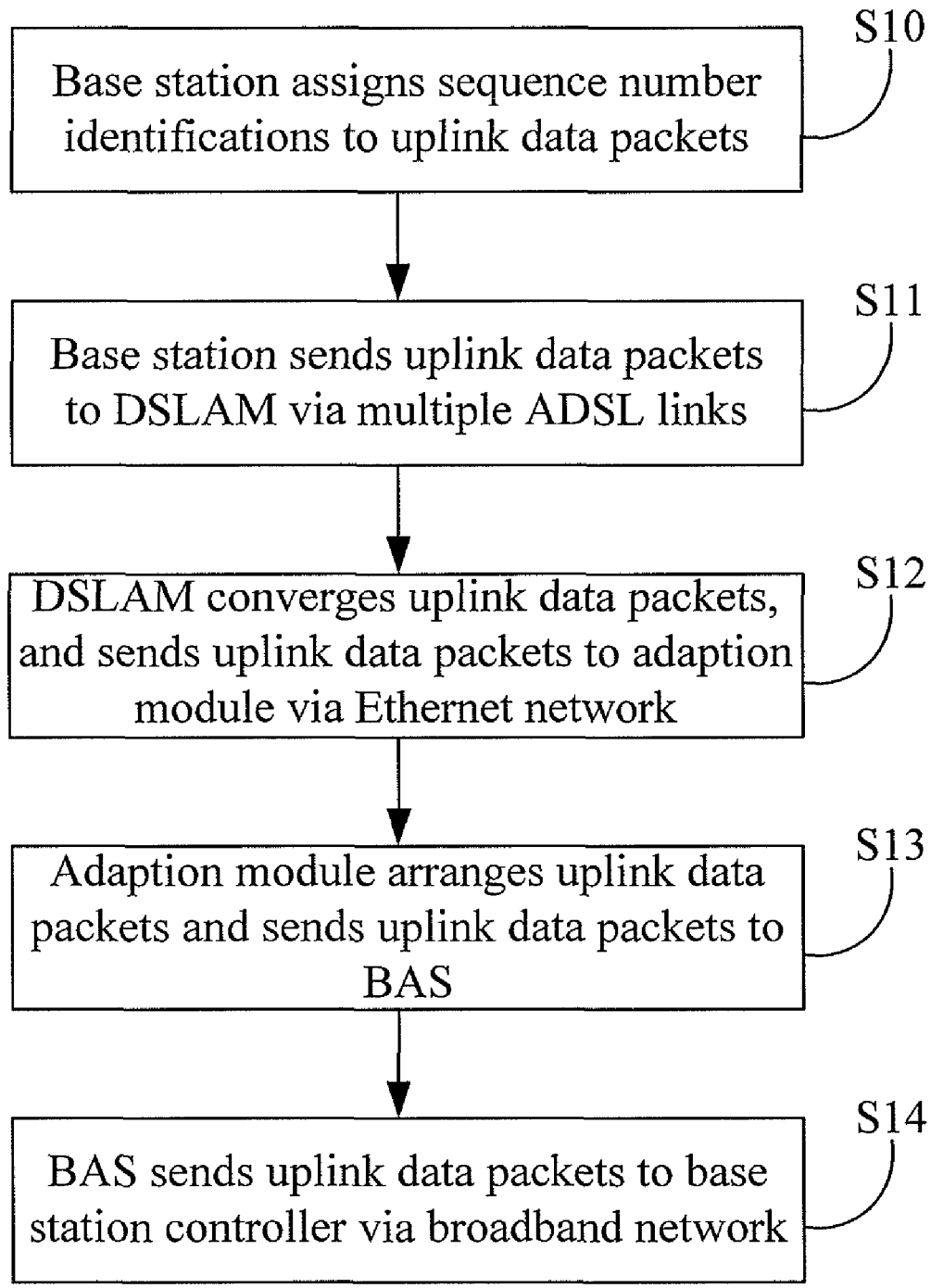
FIG. 4 is a flow chart illustrating a base station uplink data transmission method according to a second embodiment of the present invention.

FIG. 4 shows a flow chart of a base station uplink data transmission method according to a second embodiment of the present invention. A primary implementation procedure of the method is described as below. p In process S10, the base station receives uplink data sent from terminals, performs a baseband processing and a radio frequency processing on the uplink data to obtain Frame Protocol (FP) frames as payload to be transferred on the transmission network layer, encapsulates the payload into IP packets (by adding an IP packet header), and sends the IP packets to a PPP layer to encapsulate the IP packets into PPP packets (by adding a PPP packet header), and then assigns a sequence number identification to each of the PPP packets in turn according to the ML-PPP protocol so as to form ML-PPP packets.

In process S11, the base station maps the ML-PPP packets into Ethernet frames of the second layer, and sends the Ethernet frames to the DSLAM via the Ethernet interfaces on the base station by carrying the Ethernet frames on multiple ADSL links.

In process S12, the DSLAM receives and converges the ML-PPP packets transmitted through the multiple ADSL links, and forwards the converged ML-PPP packets to the adaption module via the fast Ethernet network.

In process S13, the adaption module receives the ML-PPP packets from the DSLAM, arranges the received ML-PPP packets according to the sequence number identifications of the ML-PPP packets, removes the sequence number identifications and the PPP headers from the arranged ML-PPP packets to restore the IP packets, and then maps the IP packets onto the second layer and sends the data packets to the BAS via an uplink port.

Because the ML-PPP packets are transferred through the multiple links, the ML-PPP packets reaching the adaption module through different links may have different delay variations. Therefore the adaption module needs to have a buffer for arranging the received ML-PPP packets. The size of the buffer depends on the network jitter and storage as well as a balance of delay requirements for services. Generally, the delay variations of today's IP networks in this field have a magnitude of 10 ms, and thus the storage of the buffer needs to have a delay variation tolerance of approximate 10 ms. When the ML-PPP packets are received by the adaption module, if an interruption occurs in the sequence number identifications, it is indicated that a packet is lost. In this case, the adaption module firstly holds on for a buffering period. If the adaption module has not received the lost ML-PPP packet in this buffering period, it removes the sequence number identifications and the PPP headers from the arranged ML-PPP packets to restore the IP packets, and sends the IP packets to an upper layer. The upper layer assembles the received IP packets into frames and determines whether discarding or a retransmitting is to be performed. If the upper-layer protocol is a Transfer Control Protocol (TCP), the lost data packet needs to be retransmitted, and if the upper-protocol is a User Datagram Protocol (UDP), the lost data packet needs only to be discarded without being retransmitted.

In process S14, the BAS sends the uplink IP packets to the base station controller via the broadband IP network.

The base station uplink data transmission method according to the second embodiment of the present invention is exemplarily described hereunder.

The base station is connected to three ADSL Modems respectively via Ethernet ports 1, 2 and 3, and each of the ADSL Modems is connected to the DSLAM via a twisted-pair. When the base station needs to send four uplink data packets, it puts the four uplink data packets into four PPP packets respectively, and assigns a sequence number identification (N, N+1, N+2 and N+3 respectively) to each of the PPP packets in turn. Then the base station sends the uplink PPP data packet with the sequence number identification as N via the Ethernet port 1, sends the uplink PPP data packet with the sequence number identification as N+1 via the port 2, sends the uplink PPP data packet with the sequence number identification as N+2 via the port 3, and then sends the uplink PPP data packet with the sequence number identification as N+3 via the port 1 again. After receiving the uplink PPP data packets from the base station, the DSLAM converges the uplink PPP data packets and forwards the converged uplink PPP data packets to the adaption module. The adaption module arranges the uplink PPP data packets in order according to the sequence number identifications of the uplink PPP data packets and forwards the arranged uplink PPP data packets to the base station controller via the IP network.

Figure 5:
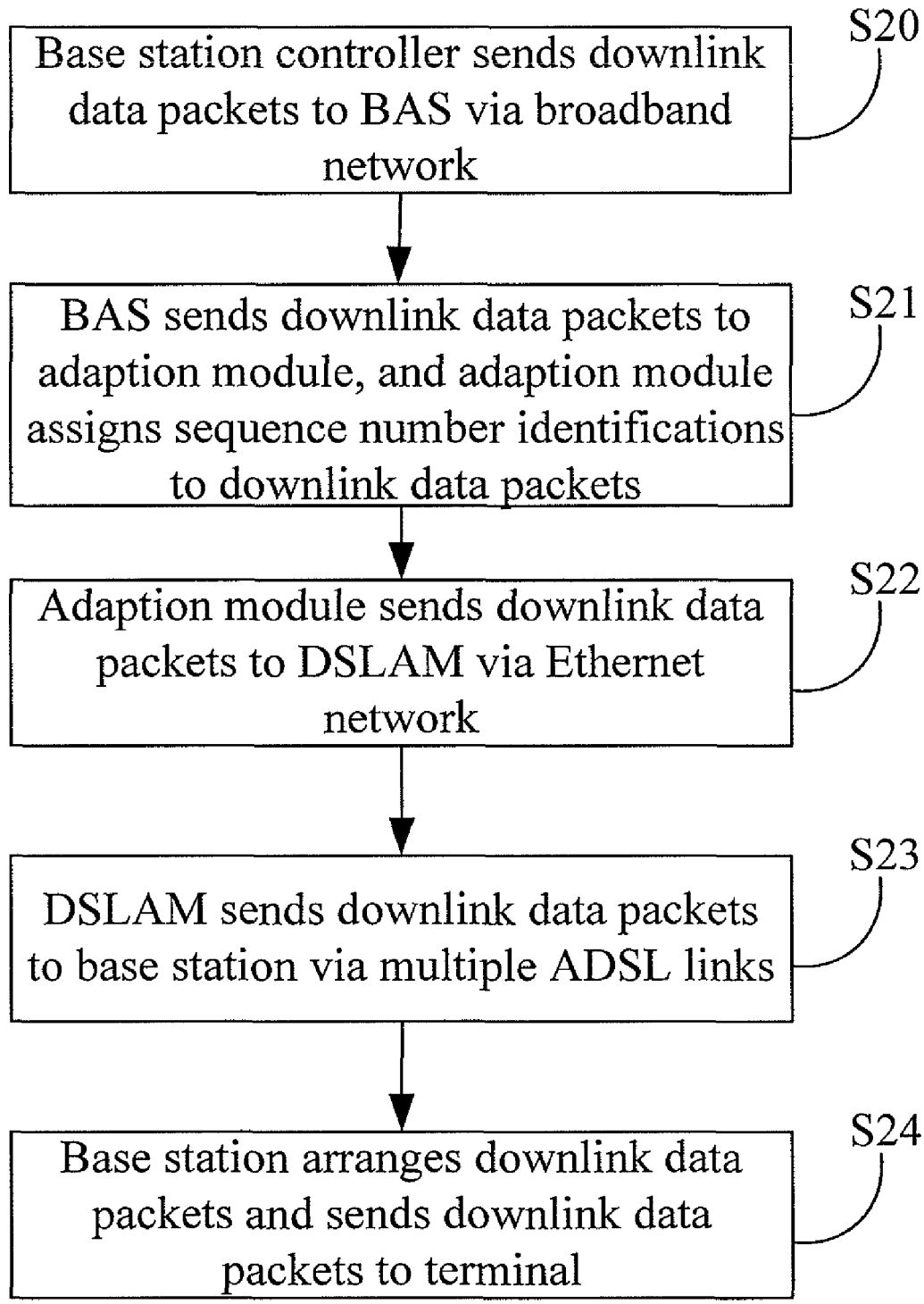
FIG. 5 is a flow chart illustrating a base station downlink data transmission method according to a third embodiment of the present invention.

FIG. 5 shows a flow chart of a base station downlink data transmission method according to a third embodiment of the present invention. A primary implementation procedure of the method is described as bellow.

In process S20, the base station controller sends downlink IP packets to the BAS via the broadband IP network.

In process S21, the BAS sends to the adaption module the downlink IP packets sent from the base station controller, and the adaption module sends the downlink IP packets to the PPP layer to encapsulate these IP packets into PPP packets (by adding a PPP packet header), and then assigns a sequence number identification to each of the PPP packets in turn so as to form ML-PPP packets.

In process S22, the adaption module sends the ML-PPP packets to the DSLAM via the fast Ethernet network.

In process S23, the DSLAM sends the ML-PPP packets to the base station through multiple ADSL links.

In process S24, the base station receives the ML-PPP packets from the multiple ADSL links, arranges the ML-PPP packets in order according to the sequence number identification of the ML-PPP packets, and extracts the IP data packets from the ML-PPP packets. Then the base station extracts FP frames from the IP data packets, performs a baseband processing such as encoding, modulating and spreading frequency and a radio frequency processing on the FP frames, and then transmits resulting signal to the terminal.

The same as in the adaption module, the base station also needs a buffer for arranging the received data packets. When the ML-PPP packets are received by the receiver, if an interruption occurs in the sequence number identifications, it is indicated that a packet is lost. In this case, the base station firstly waits for a buffering period. If the adaption module has not received the lost ML-PPP packet in this buffering period, it removes the sequence number identifications and the PPP headers from the arranged ML-PPP packets to restore the IP packets, and sends the IP packets to an upper layer. The upper layer assembles the received IP packets into frames and determines whether discarding or retransmitting is to be performed. If the upper-layer protocol is the TCP protocol, the lost data packet needs to be retransmitted, and if the upper-protocol is the UDP protocol, the lost data packet needs only to be discarded without being retransmitted.

The present invention employs the ML-PPP to bundle the multiple ADSL links, and implements the accessing of the base station by using the bundled ADSL links, thereby effectively increasing the transmission bandwidth in the base station access while ensuring the transmission distance of the base station access. Therefore the present invention may be widely applied to the accessing of base stations far from the DSLAM and/or base stations having a demand for a broader transmission bandwidth.

It is apparent that modifications and variations can be made to the invention by those skilled in the art without departing from the scope of the invention. The present invention tends to cover any of such modifications or variations within the scope of the accompanying claims and their equivalents.

The invention claimed is:

1. A base station access system, comprising:
a base station, configured to assign sequence number identifications to uplink point to point protocol (PPP) packets using a multi-link point to point protocol (ML-PPP) so as to form uplink ML-PPP packets and map the uplink ML-PPP packets with the sequence number identifications into Ethernet frames and send the Ethernet frames to a digital subscriber line access multiplexer via multiple digital subscriber lines (DSL) links; and further configured to receive downlink ML-PPP packets sent via the multiple DSL links, arrange the downlink ML-PPP packets according to sequence number identifications of the received downlink ML-PPP packets using the ML-PPP, extract downlink data packets and send the downlink data packets; and
a broadband access point, configured to receive the Ethernet frames containing the uplink ML-PPP packets transferred via the multiple DSL links, arrange the uplink ML-PPP packets according to the sequence number identifications of the received uplink ML-PPP packets using the ML-PPP, extract uplink data packets and send the uplink data packets; and configured to assign sequence number identifications to downlink PPP packets using the ML-PPP so as to form the downlink ML-PPP packets and send the downlink ML-PPP packets via the multiple DSL links.

2. The base station access system according to claim 1, wherein the base station access system further comprises:
the digital subscriber line access multiplexer, configured to receive and converge the uplink ML-PPP packets sent from the base station, and send the uplink ML-PPP packets to the broadband access point; and configured to receive the downlink ML-PPP packets sent from the broadband access point, and send the downlink ML-PPP packets to the base station via the multiple DSL links.

3. The base station access system according to claim 2, wherein the broadband access point is connected to the digital subscriber line access multiplexer via a fast Ethernet network.

4. The base station access system according to claim 2, wherein multiple Ethernet ports corresponding to the individual DSL links respectively are provided on the base station.

5. The base station access system according to claim 4, wherein the base station is connected to the digital subscriber line access multiplexer via multiple DSL Modems.

6. The base station access system according to claim 1, wherein the DSL links are ADSL links.

7. A broadband access point for data transmission, comprising:
an adapter, configured to receive uplink multi-link point to point protocol (ML-PPP) packets sent via multiple digital subscriber line (DSL) links, arrange the received uplink ML-PPP uplink data packets according to the sequence number identifications of the received uplink ML-PPP packets using a ML-PPP, extract uplink data packets and send the uplink data packets to a broadband access server; and configured to assign sequence number identifications to the downlink point to point protocol (PPP) packets using the ML-PPP so as to form downlink ML-PPP packets and map the downlink ML-PP packets with the sequence number identifications into Ethernet frames and sending the Ethernet frames to a digital subscriber line access multiplexer (DSLAM) coupled to a base station;
the broadband access server, configured to send the extracted uplink data packets to a base station controller.

8. The broadband access point according to claim 7, wherein the adapter is disposed in the broadband access server.

9. A base station data transmission method, comprising:
assigning, by a base station, sequence number identifications to uplink point to point protocol (PPP) packets using a multi-link point to point protocol (ML-PPP) so as to form uplink ML-PPP packets;
mapping by the base station the uplink ML-PPP packets with the sequence number identifications into Ethernet frames;
sending, by the base station, the Ethernet frames containing the uplink ML-PPP packets with the sequence number identifications out via multiple digital subscriber line (DSL) links to a broadband access point through a digital subscriber line access multiplexer (DSLAM) so that the broadband access point receives the uplink ML-PPP packets transferred via the multiple DSL links, arranges the received uplink ML-PPP packets according to the sequence number identifications of the received uplink ML-PPP packets using the ML-PPP, extracts uplink data packets and sends the extracted uplink data packets.

10. The base station data transmission method according to claim 9, further comprising:
receiving, by the digital subscriber line access multiplexer, the uplink ML-PPP packets sent from the base station via the multiple DSL links,
converging, by the digital subscriber line access multiplexer, the uplink ML-PPP packets sent from the base station via the multiple DSL links,
sending, by the digital subscriber line access multiplexer, the uplink ML-PPP packets to the broadband access point.

11. The base station data transmission method according to claim 9, further comprising:
requesting, by the broadband access point, the base station to retransmit one or more unreceived uplink data packets or discarding, by the broadband access point, one or more received uplink data packets, when there are one or more unreceived uplink ML-PPP packets determined by the broadband access point according to the sequence number identifications of the received uplink ML-PPP packets.

12. The base station data transmission method according to claim 9, wherein the DSL links are ADSL links.

13. A base station data transmission method, comprising:

assigning, by a broadband access point, sequence number identifications to downlink point to point protocol (PPP) packets using a multi-link point to point protocol ML-PPP) so as to form downlink ML-PPP packets, and mapping, by the broadband access point, the downlink ML-PPP packets with the sequence number identifications into Ethernet frames;

sending, by the broadband access point, the Ethernet frames containing the downlink ML-PPP packets with the sequence number identifications via multiple digital, subscriber line (DSL) links to a base station through a digital subscriber line access multiplexer (DSLAM); so that the base station receives the downlink ML-PPP packets transferred via the multiple DSL links, arranges the received downlink ML-PPP packets according to the sequence number identifications of the received downlink ML-PPP packets using the ML-PPP, extracts downlink data packet and sends the extracted downlink data packets to terminals.

14. The base station data transmission method according to claim 13, further comprising:

sending, by the digital subscriber line access multiplexer, the downlink ML-PPP packets with the sequence number identifications to a base station via multiple the DSL links.

15. The base station data transmission method according to claim 13, further comprising:

requesting, by the base station, the broadband access point to retransmit one or more unreceived downlink data packets or discarding received downlink data packets, when there are one or more unreceived downlink ML-PPP packets determined by the base station according to the sequence number identifications of the received downlink ML-PPP packets.

16. The base station data transmission method according to claim 13, wherein the DSL links are ADSL links.

17. A base station, wherein the base station is configured to assign sequence number identifications to uplink point to point (PPP)packets using a multi-link point to point protocol (ML-PPP) so as to form uplink ML-PPP packets and map the uplink ML-PPP packets with the sequence number identifications into Ethernet frames and send the Ethernet frames containing the uplink ML-PPP-packets via multiple digital subscriber, line (DSL) links; and configured to receive Ethernet frames containing downlink ML-PPP packets with sequence number identifications sent via the multiple DSL links, arrange the downlink ML-PPP packets according to the sequence number identifications of the received downlink ML-PPP packets using the ML-PPP, extract the downlink data packets and send the downlink data packets.

* * * * *